(12) United States Patent
Hoffmann

(10) Patent No.: US 12,490,745 B2
(45) Date of Patent: Dec. 9, 2025

(54) KNEADING MACHINE FOR FOOD DOUGHS, HAVING A COVER HAVING A QUICK CLOSURE

(71) Applicant: DIOSNA Dierks & Söhne GmbH, Osnabrück (DE)

(72) Inventor: Frank Hoffmann, Greven (DE)

(73) Assignee: DIOSNA DIERKS & SÖHNE GMBH, Osnabrück (DE)

(*) Notice: Subject to any disclaimer, the term of this patent is extended or adjusted under 35 U.S.C. 154(b) by 760 days.

(21) Appl. No.: 17/772,664

(22) PCT Filed: Sep. 2, 2020

(86) PCT No.: PCT/EP2020/074445
§ 371 (c)(1),
(2) Date: Apr. 28, 2022

(87) PCT Pub. No.: WO2021/083569
PCT Pub. Date: May 6, 2021

(65) Prior Publication Data
US 2022/0400689 A1  Dec. 22, 2022

(30) Foreign Application Priority Data
Oct. 29, 2019  (EP) .................................. 19205818

(51) Int. Cl.
*A21C 1/14* (2006.01)
*A21C 1/02* (2006.01)
(Continued)

(52) U.S. Cl.
CPC .............. *A21C 1/1485* (2013.01); *A21C 1/02* (2013.01); *B01F 29/85* (2022.01); *B01F 35/10* (2022.01)

(58) Field of Classification Search
CPC ....... A21C 1/1455; A21C 1/02; A21C 1/1485; A21C 1/148; A47J 43/0705;
(Continued)

(56) References Cited

U.S. PATENT DOCUMENTS 3,561,643 A * 2/1971 Kloven .................. G01G 11/08
222/240
4,162,857 A * 7/1979 Spurling .................. B01F 27/95
366/261
(Continued)

FOREIGN PATENT DOCUMENTS

CN 112690298 A * 4/2021 ............... A21C 1/02
EP 3772281 A1 * 2/2021 ............... A21C 1/02
(Continued)

OTHER PUBLICATIONS

Official Communication issued in International Patent Application No. PCT/EP2020/074445, mailed on Dec. 3, 2020.
(Continued)

*Primary Examiner* — Charles Cooley
(74) *Attorney, Agent, or Firm* — Keating & Bennett, LLP

(57) ABSTRACT

A kneading machine for food doughs includes a kneading machine frame with a lower portion and a head portion attached to the lower portion. A kneading bowl can be arranged on the lower portion, a drive to rotate the kneading bowl is provided, and a kneading tool and a drive to drive the kneading tool are held on the head portion. Safety-relevant components of the kneading machine are surrounded by a housing and a major portion of the kneading machine frame is exposed. The exposed kneading machine frame includes struts between which respective free spaces are defined. The kneading machine includes a removable cover which covers at least a major portion of the free spaces defined by the exposed kneading machine frame towards an outside. The cover is fastened to the kneading machine
(Continued)

frame and/or the housing by connections which can be released without tools.

14 Claims, 3 Drawing Sheets

(51) Int. Cl.
  *B01F 29/85* (2022.01)
  *B01F 35/10* (2022.01)
(58) Field of Classification Search
  CPC ............ A47J 2043/04463; A47J 43/082; A47J 43/044; B01F 7/1605; B01F 13/047; B01F 29/85; B01F 35/10; B01F 27/723; B01F 27/807; B01F 35/181
  USPC .................................................. 366/197–207
  See application file for complete search history.

(56) References Cited

U.S. PATENT DOCUMENTS

| | | | | |
|---|---|---|---|---|
| 5,862,743 | A * | 1/1999 | Cimenti | A21C 5/00 99/450.2 |
| 9,635,865 | B1 * | 5/2017 | Schmidt | B65G 45/10 |
| 11,097,946 | B1 * | 8/2021 | Lynn | C02F 1/78 |
| 2010/0291277 | A1 * | 11/2010 | Steeb | A21C 5/006 426/504 |
| 2018/0098547 | A1 * | 4/2018 | Frazier | A21C 15/002 |

FOREIGN PATENT DOCUMENTS

| | | | | | |
|---|---|---|---|---|---|
| EP | | 3815533 | A1 * | 5/2021 | ............... A21C 1/02 |
| EP | | 4115738 | A1 * | 1/2023 | ............... A21C 1/02 |
| EP | | 4331365 | A1 * | 3/2024 | ............... A21C 1/02 |
| EP | | 4331365 | B1 * | 2/2025 | .............. F16P 3/145 |
| WO | WO-9421552 | | A1 * | 9/1994 | .......... B01F 13/1055 |
| WO | WO-2022058477 | | A1 * | 3/2022 | ............... A21C 1/02 |

OTHER PUBLICATIONS

Official Communication issued in European Patent Application No. 19205818.8, issued on May 12, 2020.
Escher Mixers, "Brochure Spiral MD-W line", Dec. 31, 2018, [retrieved on Nov. 22, 2019], 9 pages, Retrieved from the Internet: <url: https://www.eschermixers.com/images/EscherMixers_MD-MDW-line.pdf/>.
Official Communication issued in International Patent Application No. PCT/EP2020/074445, issued on May 3, 2022.

* cited by examiner

KNEADING MACHINE FOR FOOD DOUGHS, HAVING A COVER HAVING A QUICK CLOSURE

BACKGROUND OF THE INVENTION

1. Field of the Invention

The present invention relates to a kneading machine for food doughs.

2. Description of the Related Art

Kneading machines for doughs, in particular, baking doughs, have a kneading bowl of various sizes for dough masses of 100 to 3000 kg, into each of which a motor-driven kneading tool projects for carrying out the kneading process.

Traditionally, such a kneading machine has a housing made of stainless steel. For hygienic and safety reasons, all components of the kneading machine are covered by the housing except for the kneading tool and the kneading bowl. The housing is made of several parts and is attached to the kneading machine frame by screw connections. The housing can be dismantled by skilled personnel for maintenance or repair purposes, for example. The housing is designed so that it can be easily cleaned from the outside. The kneading machine is cleaned with jet water <10 bar. The housing is sprayed off from the outside. Alternatively, dry cleaning can be performed by brushing.

In the near future, kneading machines will preferably be launched on the market with a so-called open concept, as envisaged by the EHEDG guideline. In an open concept, only safety-relevant components of the kneading machine, such as the hydraulic and/or electric drives, are covered with a housing. The kneading machine frame itself is exposed and openly accessible. The aim is to make all impurities visible for optimum hygiene and to avoid cavities that cannot be seen. In the case of kneading machine frames with a swiveling head section, a safety device must therefore also be provided to act as pinch protection for an operator of the kneading machine, because the housing no longer covers the entire kneading machine, and the operator can reach into the frame. For safety reasons alone, the kneading machine is therefore already designed differently from a conventional kneading machine. The open concept also places different demands on cleaning. This is because a large number of surfaces of the kneading machine, which lie at different angles to one another, now have to be cleaned. This means that cleaning is much more extensive and time-consuming.

SUMMARY OF THE INVENTION

Preferred embodiments of the present invention provide kneading machines each with an open concept structure and yet is easy to clean.

Accordingly, an example embodiment of the present invention provides a kneading machine for food doughs including a kneading machine frame with a lower portion and a head portion attached to the lower portion. A kneading bowl can be arranged on the lower portion and a drive to rotate the kneading bowl is attached thereto. A kneading tool and a drive to drive the kneading tool are held on the head portion. Safety-relevant components of the kneading machine are surrounded by a housing and a major portion of the kneading machine frame is exposed. The exposed kneading machine frame includes struts between which respective free spaces are defined. The kneading machine includes a removable cover which covers at least a major portion of the free spaces defined by the exposed kneading machine frame towards the outside. The cover is fastened to the kneading machine frame and/or the housing by connections which can be released quickly and without tools.

The cover, which can be quickly removed without tools, allows the dough mixer to be cleaned, as before, even with an open concept.

Preferably, the cover is made of a food-safe, water-impermeable material, in particular plastic.

The cover may include a resealable opening.

Preferably, the cover is structured such that the outside of the cover can be easily cleaned with a brush from the outside.

The quick-release connections are preferably defined by zipper connections, clip connections, hook-and-loop tape connections, snap fasteners, and/or other quick-release fasteners.

The cover can be a one piece unitary structure or several pieces.

If the cover is multi-part, the individual parts of the cover each cover a free space between the struts of the kneading machine frame.

It is advantageous if the cover covers at least a large portion of the free spaces defined by the exposed kneading machine frame to the outside, so that substantially no water or dust penetrates into an interior space surrounded by the kneading machine frame during cleaning of the kneading machine.

Preferably, the safety-related components include the drive of the kneading tool.

The housing is preferably made of steel, plastic or GRP. The free spaces can be provided on the head portion and/or the bottom portion.

The above and other elements, features, steps, characteristics and advantages of the present invention will become more apparent from the following detailed description of the preferred embodiments with reference to the attached drawings.

BRIEF DESCRIPTION OF THE DRAWINGS

Preferred embodiments of the present invention are explained in more detail below with reference to the drawings. Similar or similarly acting components are designated in the figures with the same reference signs.

DETAILED DESCRIPTION OF THE PREFERRED EMBODIMENTS

Figure 1:
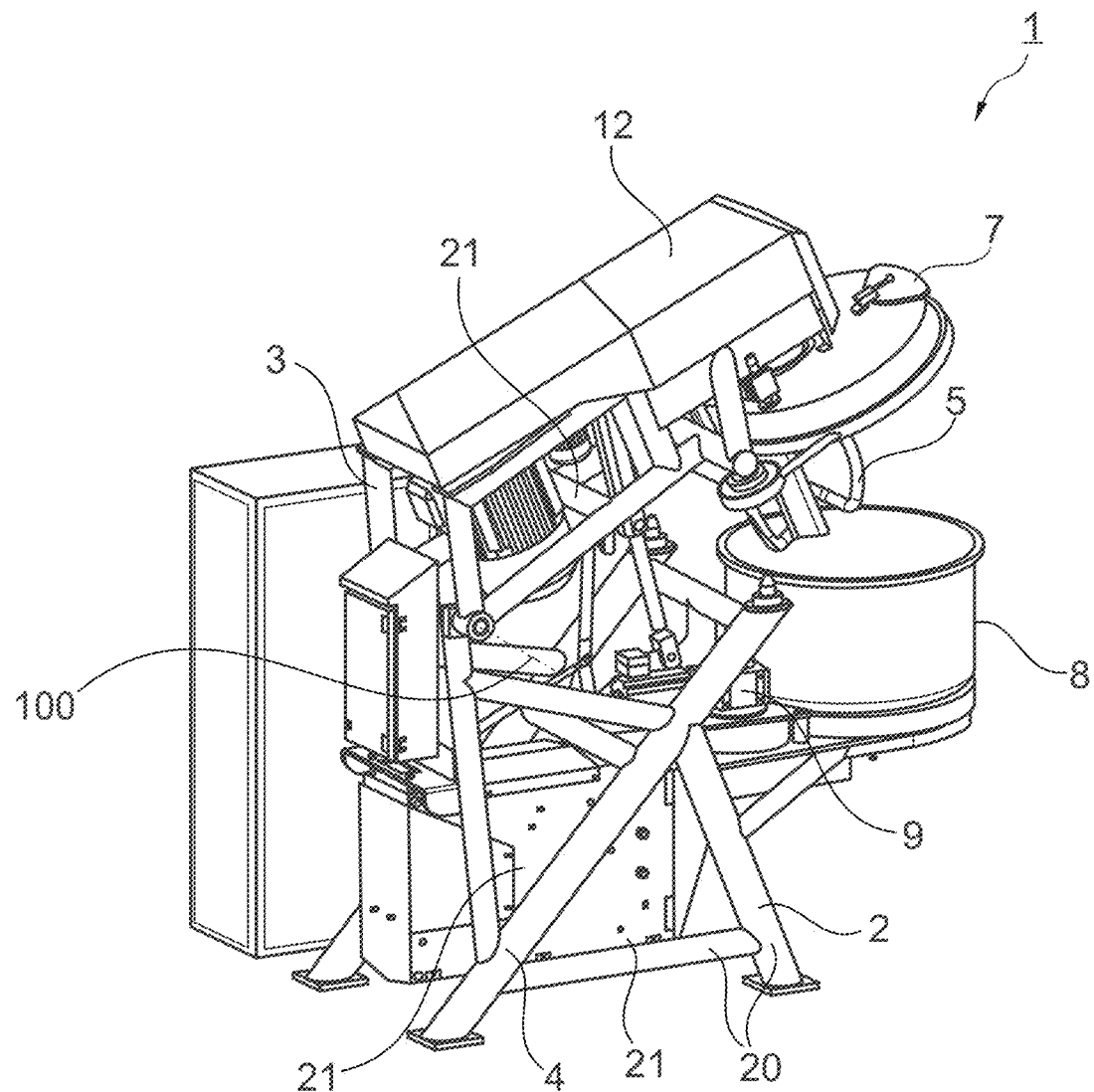
FIG. 1 shows a spatial representation of an open concept kneading machine.
Figure 2:
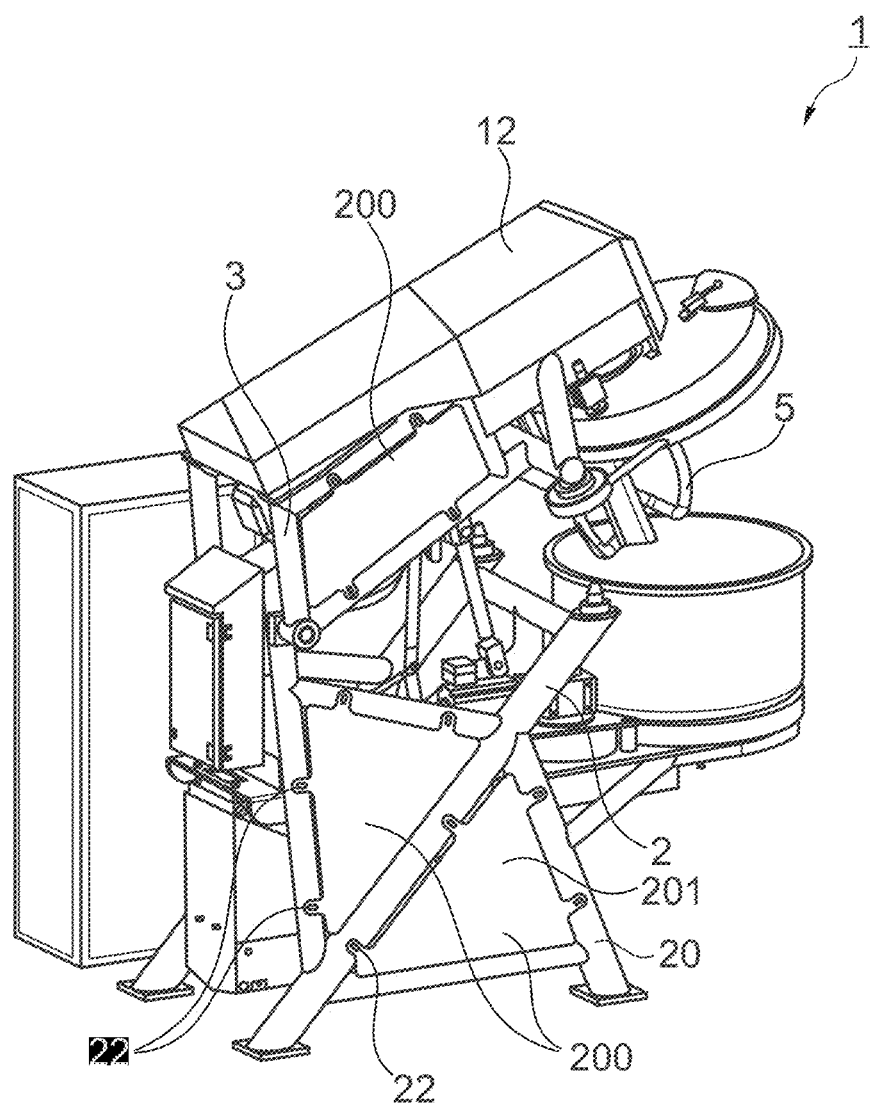
FIG. 2 shows a spatial representation of the kneading machine of FIG. 1 with an additional quickly detachable cover.

The kneading machine 1 shown in FIGS. 1 and 2 is designed for processing a food dough, in particular a baking dough. The kneading machine 1 has a kneading machine frame 2, the head portion 3 of which can be swiveled about a swivel axis 100 between a lower operating position and an upper cleaning position relative to a lower portion 4. The head portion 3 carries the kneading tool 5, shown here are two oppositely rotating spiral kneaders, and the drive required for a rotation of the kneading tool 5, as well as a cover 7, which is provided for covering the kneading bowl 8, which is open at the top. The kneading bowl 8 and an electric motor 9 are arranged in the lower portion 4 of the kneading machine 1. The electric motor 9 rotates the kneading bowl 8 about an axis of rotation, which is not shown, relative to the kneading machine frame 2. Furthermore, a swivel drive 10 is placed in the head portion 3, which is designed as a linear drive and has an electric motor. The swivel drive 10 is supported on the lower portion 4 in a swivel joint 11. By moving the linear drive, the distance from the head portion 3 to the lower portion 4 is increased or decreased, resulting in a swiveling of the head portion 3 relative to the stationary lower portion 4 about the swiveling axis 100.

The kneading machine 1 has a housing 12 formed of stainless steel sheets. The housing 12 covers only the drive of the kneading tool. The kneading machine frame 2 is largely exposed and is not surrounded by the housing 12.

An additional cover 200, shown in FIG. 2, which serves as an outer covering, is attached to the kneading machine frame 2. The cover 200 is attached to the kneading machine frame 2 in a quickly detachable manner. The cover 200 is made of a food-safe, water-impermeable material, in particular plastic or fiber-reinforced plastic. However, stainless steel or a fabric tarpaulin may also be used. In the preferred embodiment shown, the cover 200 has a plurality of panels 201, each of which covers a gap 21 formed by the struts 20 of the kneading machine frame 2 towards the outside. At least a portion of the cover 200 covers one free space between the struts 20 of the kneading machine frame 2 which is located at a vertical position above or at a same level as the kneading bowl 8. Preferably, the cover 200 replaces the conventionally used housing, i.e., it seals off the kneading machine 1 from the outside except for the kneading bowl 8 and the kneading tools 5. The cover 200 has no inwardly projecting surfaces or recesses, and the number of contiguous surfaces of the cover 200 is reduced to a minimum, so that the cover 200 is easy to clean and no specially trained personnel are required for cleaning. Cleaning is preferably done with brushes or with jet water <10 bar. The quick release connections 22 allow the cover 200 to be easily and quickly removed and attached without the need for additional tools. The quick release connections may be zipper connections, clip connections, hook-and-loop tape connections, or a combination thereof.

Other quick-release form-fit fasteners may also be used, such as snap-fit fasteners or other quick-release fasteners such as bayonet fasteners or the like.

The cover may also be connected to the kneading machine frame and/or housing by detachable connections such as cords, buttons, hooks and eyes.

It is advantageously provided that the cover is made of a transparent material. This allows the operator to check the condition of the kneading machine without removing the cover, and in particular to check whether the kneading machine has become dirty under the cover. If cleaning, repair, or maintenance is required, the cover can be quickly and easily detached and removed from the kneading machine. The material of the cover is preferably chosen so light that the cover can be removed by one person alone.

The cover can be made in several parts, whereby the parts are also preferably connected to one another by quick-release connections.

Figure 3:
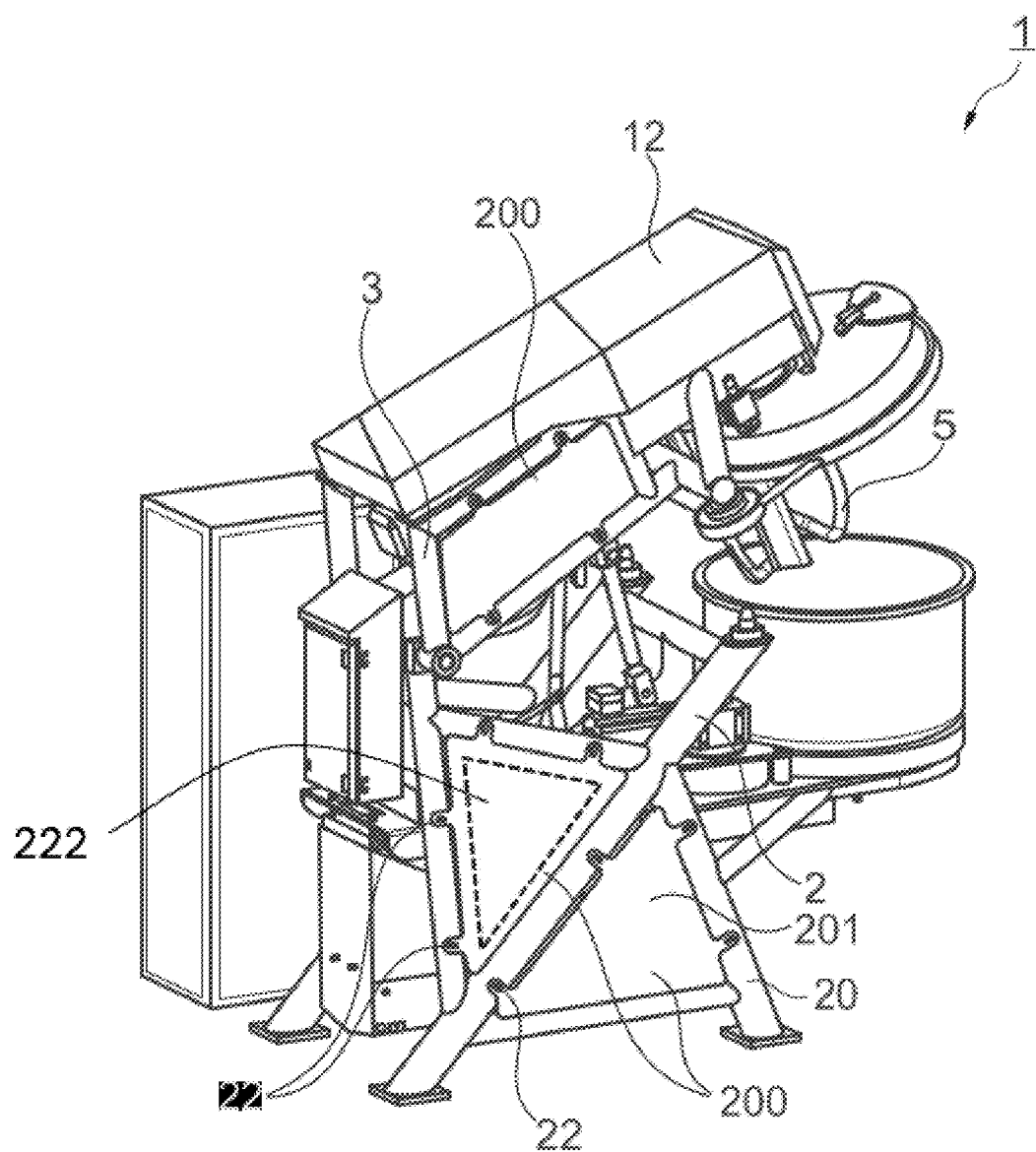
FIG. 3 shows a spatial representation of the kneading machine of FIG. 1 with an additional example embodiment of a quickly detachable cover.

It may also be provided that the cover has a resealable opening 222 (as shown in FIG. 3) that allows one to reach or walk through the cover and thus makes the kneading machine frame accessible without having to remove the entire cover.

The cover allows cleaning to be carried out as usual without extra effort despite the open concept of the kneading machine. The cleaning personnel do not have to be specially trained and can maintain the usual cleaning procedure. The cover can also be manufactured inexpensively and is preferably easy to attach and remove by one person without tools.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A kneading machine for food doughs, the kneading machine comprising:
    a kneading machine frame with a lower portion and a head portion fastened to the lower portion;
    a kneading bowl which can be arranged on the lower portion;
    a drive to rotate the kneading bowl; and
    a kneading tool and a drive to drive the kneading tool held on the head portion; wherein safety-relevant components of the kneading machine are surrounded by a housing and a major portion of the kneading machine frame is exposed and uncovered by the housing;
    the exposed kneading machine frame includes struts between which respective free spaces are defined;
    the kneading machine includes a removable cover which covers at least a majority of the free spaces defined by the exposed kneading machine frame towards the outside;
    the cover is fastened to the kneading machine frame and/or the housing by connections which can be released without tools; and
    at least a portion of the removable cover covers one of the free spaces which is located at a vertical position above or at a same level as the kneading bowl.

2. The kneading machine according to claim 1, wherein the cover is made of a food-safe, water-impermeable material.

3. The kneading machine according to claim 1, wherein the cover is made of a plastic.

4. The kneading machine according to claim 1, wherein the cover includes a resealable opening.

5. The kneading machine according to claim 1, wherein the cover is structured such that an outside of the cover can be cleaned from outside with a brush.

6. The kneading machine according to claim 1, wherein the connections are defined by zipper connections, clip connections, hook-and-loop tape connections, snap fasteners and/or quick-release fasteners.

7. The kneading machine according to claim 1, wherein the cover is defined by a single unitary structure.

8. The kneading machine according to claim 1, wherein the cover includes multiple parts.

9. The kneading machine according to claim 8, wherein the multiple parts of the cover each cover a free space between the struts.

10. The kneading machine according to claim 1, wherein the cover covers at least a majority of the free spaces defined by the exposed kneading machine frame to an outside, so that substantially no water or dust penetrates into an interior space surrounded by the kneading machine frame during cleaning of the kneading machine.

11. The kneading machine according to claim 1, wherein the safety-related components include the drive that drives the kneading tool.

12. The kneading machine according to claim 1, wherein the removable cover is able to be completely removed and detached from the kneading machine frame and/or the housing by the connections which can be released without tools.

13. The kneading machine according to claim 1, wherein the major portion of the kneading machine frame which is exposed and uncovered by the housing is a majority of the kneading machine frame.

14. The kneading machine according to claim 1, wherein portions of the kneading machine frame remain exposed and uncovered even when the removable cover is installed.

* * * * *